Inventor:
Walter H. Gordon, Jr.
by Laurence R. Kempton
His Attorney.

3,204,066
THERMAL-ELECTRICAL CONTROL DEVICE HAVING THERMALLY EXPANSIVE MATERIAL AS A SWITCH ACTUATOR

Walter H. Gordon, Jr., Asheboro, N.C., assignor to General Electric Company, a corporation of New York
Filed Oct. 24, 1961, Ser. No. 147,312
5 Claims. (Cl. 200—140)

This invention relates to a device, and to circuits for use therewith, for controlling electrical apparatus in response to a combination of current and ambient heat. The invention is particularly useful as a control circuit for electric blankets and the like.

An object of the invention is to provide an electrical control device which is responsive to a combination of current and ambient heat.

Another object is to provide a thermal-electrical device, and circuits therefor, for achieving cyclic control of current in a load device.

Figure 1:
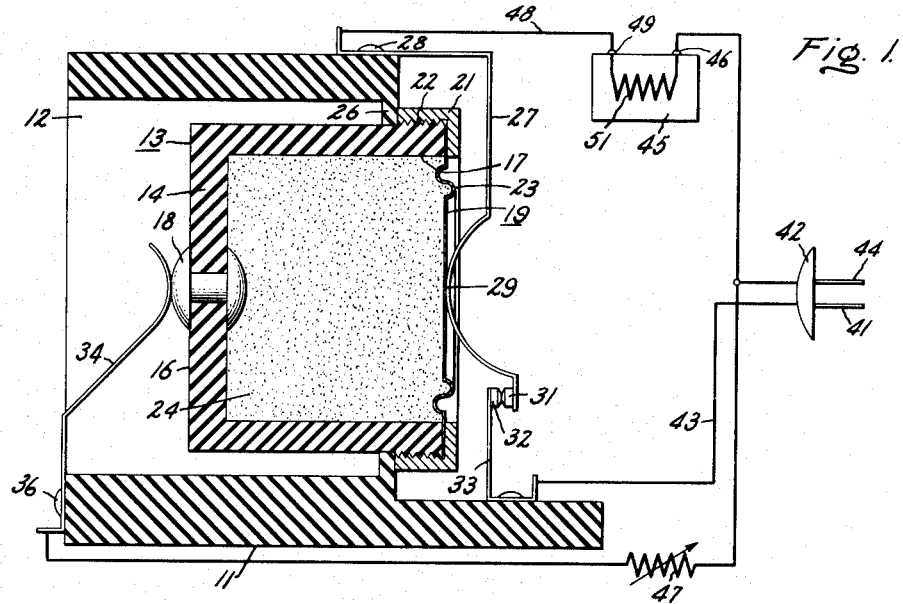
Figure 2:
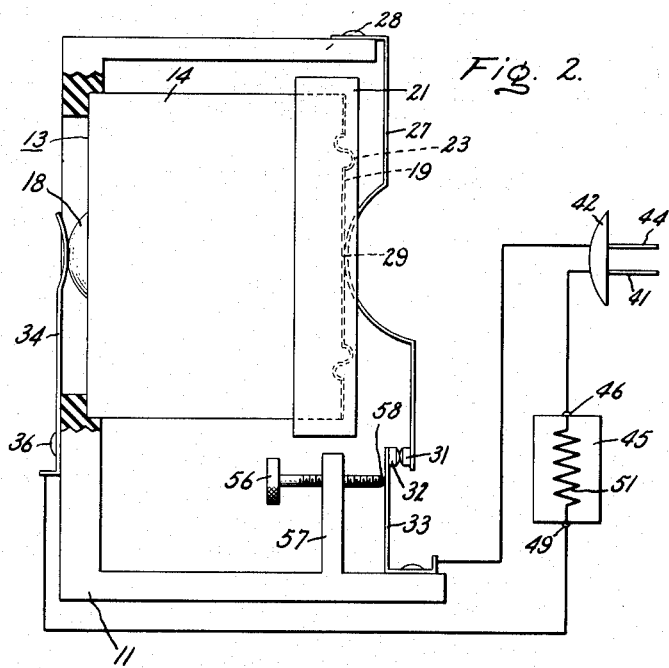

Still further objects will be apparent from the following description and claims, and from the accompanying drawing in which:

FIG. 1 shows a preferred embodiment of the control device of the invention, the device being shown in cross-section, the figure also showing schematically preferred electrical connections to the control device; and FIG. 2 shows an alternative electrical circuit connected to the control device of the invention.

The control device of the invention comprises a housing of electrically non-conductive material containing a thermally expansive non-conductive material such as wax, this thermally expansive material being impregnated with particles of electrically conductive material such as powdered carbon. Electrical contacts are made to this mixture at two opposite ends of the housing, at least one of these electrical contacts being movable in response to expansion or contraction of the aforesaid mixture contained within the housing. A pair of electrical contacts are arranged to be selectively closed in response to expansion or contraction of the mixture contained within the housing of the device. In a preferred circuit using this device, electrical connections are made through the device and to a load apparatus so that current is simultaneously applied to the load and through the mixture contained in the housing of the device, the control contacts of the thermally actuated device being connected in series with the load apparatus, whereby current to the load apparatus is cyclically disrupted at a rate dependent upon ambient temperature and the amount of current passing through the mixture contained in the control device.

Now referring to FIG. 1, there is shown a base 11, made from an electrically insulative material, and containing an opening 12 in which a control device 13 is positioned. The control device 13 comprises a housing 14 of electrically non-conductive material such as nylon. Preferably, the housing 14 is cylindrical and is provided with a closed end 16 and an open end 17. An electrically conductive rivet 18 is positioned through an opening in the closed end 16 of the housing. A flexible diaphragm 19 of electrically conductive material, such as Phosphor bronze, is positioned over the open end of the housing 13 by means of a threaded ring 21 which is threaded onto the housing 14 by means of threads 22. The diaphragm 19 may be provided with one or more concentric annular folds 23 to provide flexibility at the central region thereof.

The housing 14 is filled with a mixture of a thermally expansive electrically insulating material, such as paraffin wax, and electrically conductive particles such as powdered carbon. This mixture is indicated by the numeral 24. A preferred mixture is 30% to 60% carbon particles, by weight, in paraffin wax.

The control device 13 is positioned in the opening 12 of the base 11, with the ring 21 thereof abutting against an annular shoulder 26 of the base 11 at an end of the opening 12. The control device is held in place by means of an electrically conductive contact spring 27 which is attached to the housing 11 at 28. The contact spring 27 is shaped to resiliently press against the diaphragm 17 at the central region 29 thereof, and the free end of the contact spring 27 is provided with an electrical contact 31. A fixed electrical contact 32 is positioned in alignment with the contact 31, by means of a bracket 33 attached to the base 11. A resilient contact arm 34, of electrically conductive material, is attached to the base 11 at 36, and resiliently engages the contact rivet 18 of the control device 13.

A contact prong 41 of a power plug 42 is electrically connected to the contact 32 by means of a wire 43. Another electrical contact prong 44 of the plug 42 is electrically connected to a terminal 46 of a load apparatus 45, and also is connected, through a rheostat 47, to the contact arm 34. An electrical connection 48 is provided between the contact spring 27 and another terminal 49 of the load apparatus 45. The power plug 42 is adapted for connection to a suitable socket supplying either alternating or direct current. The load apparatus 45 may comprise, for example, an electrically resistive heating wire 51 of an electric blanket.

The apparatus of FIG. 1 functions as follows. The contact spring 27 is suitably shaped and arranged so that the contacts 31 and 32 are electrically closed when the thermally expansive mixture 24 is at a room temperature, for example 70° F. When power is supplied to the plug 42, current is supplied to the load 45 through the closed contacts 31–32. Also, current is supplied through the mixture 24, from the contact rivet 18 to the conductive diaphragm 19, or vice versa, through the adjustable rheostat 47. This current causes the carbon particles to heat sufficiently to cause the thermally expansive wax to expand, thereby moving the diaphragm 19 outwardly against the contact spring 27, whereby the contacts 31–32 become electrically opened. This removes electrical power from the load 45, and also opens the current path for the mixture 24 whereupon the mixture cools and contracts sufficiently so that the contacts 31–32 re-establish the electrical connection to the load 45 and mixture 24. This occurs cyclically, and the heat produced in the load 45, for example in a blanket heater wire 51, will depend on the average value of cyclic current applied thereto. By adjusting the rheostat 47 to have a lower value of resistance, the mixture 24 will expand more rapidly in response to the higher value of current therein, thereby opening the contacts 31–32 more rapidly during each cycle and decreasing the average amount of power supplied to the heating wire 51, and producing a lesser amount of heat in the electric blanket or other device 45. Similarly, adjustment of the rheostat 47 for increased resistance will cause an increase in the average power supplied to the load 45. The rheostat 47 can be a manually adjustable temperature control for the device 45.

It is desirable to provide relatively more heat to an electric blanket when room temperature is relatively cooler, and vice versa. The device 13 automatically achieves this desired function, because a relatively higher room temperature will cause the mixture 24 to be relatively more expanded, thereby causing the contacts 31–32 to be open a relatively greater proportion of time during the cyclical opening and closing thereof. Thus, it is seen that the control device and circuit of the invention achieve a control arrangement for an electric blanket or the like, which is manually adjustable by means of the rheostat 47 to provide a desired amount of average heat, and which automatically adjusts the amount of heating to compensate for different ambient room temperatures.

In the alternative arrangement of FIG. 2, elements which are the same as those of FIG. 1 are given the same reference numerals as in FIG. 1. In FIG. 2, the contact blade 41 of the power plug 42 is connected to the terminal 46 of the load 45, and the load contact 49 is connected to the spring contact arm 34. The relative position of spring blade 33 is adjustably controlled by means of a thumb nut 56 threaded through an upstanding arm 57 of the frame. An insulating tip 58 would normally be used for engagement with spring blade 33. The contact blade 44 of the power plug 42 is connected to the contact arm 33.

The arrangement of FIG. 2 operates generally similar to that of FIG. 1, except that manual adjustment is achieved by turning the control knob 56, thereby positioning contact 32 carried by spring blade 33 relative to movable contact 31. In the circuit of FIG. 2, the load 45 is electrically connected in series with the mixture 24 contained in the device 14, when the contacts 31–32 are closed. Adjustment screw 56 is set so that the contacts 31–32 are electrically closed in the absence of power supplied to the plug 42. When power, either alternating or direct current, is supplied via the plug 42, current flows through the load 45 and through the mixture 24 contained in the device 13, thereby supplying heat to the resistive heater element 51 if the load 45 is an electric blanket, for example, and the same current flows through the mixture 24 in the device 13, thereby causing the mixture 24 to expand as previously described, and subsequently this expansion will move the contact spring 27 so as to electrically open the contacts 31–32, thereby de-energizing the load 45. The mixture 24 thereupon cools and contracts until the contacts 31–32 again make electrical contact. Thus, current is applied cyclically to the load 45. By turning the temperature control knob 56 to move contact 32 to the right, as shown in FIG. 2, current will be cycled "on" relatively more of the time to the load 45, thereby providing a greater amount of average heat in the heater element 51. As described above, ambient temperature control is achieved automatically by the device 13, since a relatively higher ambient room temperature will cause the mixture 24 to be relatively more expanded, thereby causing the contacts 31–32 to be electrically open a relatively greater amount of time during the cyclic operation of the apparatus.

While perferred embodiments of the invention have been shown and described, various other embodiments and modifications thereof will be apparent to those skilled in the art and are included in the scope of invention as defined in the following claims:

What I claim is:

1. An electrical conrtol device comprising a housing of insulative material closed at one end by a fixed wall, a mixed material within said housing, a first constituent of said material being electrically conductive, a second constituent of said material being electrically insulative and thermally expansive whereby said material expands in response to current flow through said material, a pair of spaced current contacts in engagement with said material and adapted to be connected to a source of power, one of said current contacts comprising a flexible diaphragm positioned over the open end of said housing and being movable upon expansion and contraction of said material, the other of said current contacts being positioned through an oepning in said fixed wall of said housing a resilient contact arm positioned in mechanical and electrical engagement with said flexible diaphragm, an electrical contact secured to said arm, and a fixed contact arranged to be engaged by said last-named contact when said material is in a nonexpanded condition.

2. A control circuit comprising: first and second current supply terminals adapted to be connected to a source of current, an electrical load having two terminals, a pair of normally closed electrical contacts, one of said electrical contacts being movable, means connecting said first current supply terminal to one terminal of said electrical load, and means connecting the other terminal of said load to one of said electrical contacts, a control device comprising an insulative housing, electrically conductive thermally expansive material within said housing, a pair of spaced current contacts in engagement with said material, one of said current contacts being movable upon expansion of said material, said movable electrical contact being electrically and mechanically coupled with said one current contact whereby said electrical contacts become opened upon expansion of said material in response to the electrical current passed therethrough and to ambient temperature, means connecting said other current contact to said first current supply terminal, and means connecting said second current supply terminal to the other electrical contact of said device.

3. A control circuit as claimed in claim 2, further including an adjustable rheostat connected between said second current supply terminal and said fixed current contact for regulating the electrical current passed through said thermally expansive material.

4. A control circuit comprising an electrical control device having an electrically insulative housing containing a thermally responsive expandable electrically conductive material, first and second current contacts spaced apart and in engagement with said material, the second of said current contacts being movable with expansion of said material, a pair electrical contacts arranged to be normally closed, one of said electrical contacts being fixed and the other being elecrtically and mechanicaly coupled with said movable current contact whereby said electrical contacts become electrically opened upon expansion of said material in response to electrical current passed therethrough and to ambient temperature, the first current contact and the fixed electrical contact constiuting terminals of said control device, a two-terminal load apparatus, a two-terminal source of current, and means connecting said control device terminals, said load terminals, and said current source terminals in electrical series.

5. An electrical control device as recited in claim 1 including a supporting means including a wall having means defining an aperture therein, said insulative housing adapted for positioning in said aperture, said housing having a closed end and an open end each positioned on one side of said wall, means secured to one of said housing ends for preventing movement of said housing through said aperture in one direction, and a conductive contact arm secured to said support means in resilient engagement with diaphragm for holding said housing in said wall.

References Cited by the Examiner

UNITED STATES PATENTS

| | | | |
|---|---|---|---|
| 1,874,909 | 8/32 | Conklin | 219—19 X |
| 2,524,886 | 10/50 | Colander et al. | 219—20 |
| 2,554,534 | 5/51 | Long et al. | 200—122 |
| 2,861,163 | 11/58 | Asakawa | 200—140 |
| 2,978,665 | 4/61 | Vernet et al. | 338—223 |
| 3,016,691 | 1/62 | Asakawa et al. | 73—368 X |
| 3,131,275 | 4/64 | Zimmerman et al. | 200—140 |

BERNARD A. GILHEANY, *Primary Examiner.*

RICHARD M. WOOD, *Examiner.*